Patented Dec. 2, 1947

2,431,896

UNITED STATES PATENT OFFICE 2,431,896

PROCESS FOR THE PRODUCTION OF PYRAZINE DERIVATIVES

John Weijlard, Westfield, and Max Tishler, Rahway, N. J., and Arthur E. Erickson, Brooklyn, N. Y., assignors to Merck & Co., Inc., Rahway, N. J., a corporation of New Jersey No Drawing. Application September 18, 1943, Serial No. 502,971

5 Claims. (Cl. 260—250)

This invention relates to the preparation of amino-pyrazines, and more particularly it relates to a method for preparing such substances from polynuclear compounds containing a lumazine nucleus.

The process of this invention is valuable in that it permits rapid, easy, and economical production of amino-pyrazines which are unusually difficult to prepare, and which cannot be prepared readily by methods heretofore available.

We have found that by our new degradation reaction, involving the opening and partial destruction of a pyrimidine ring, polynuclear compounds containing a lumazine nucleus may be cleaved, under strongly acid conditions, to form the corresponding amino-pyrazines.

The polynuclear compounds may be lumazine or a compound containing a lumazine nucleus, and corresponding compounds in which one or more of the hydrogens are replaced by an aliphatic or aromatic radical, such as, for example, di- or mono- lower alkyl substituted lumazines, di- or mono-phenyl-substituted lumazines, alloxazine, etc.

The reaction may be illustrated as follows, in terms of lumazine:

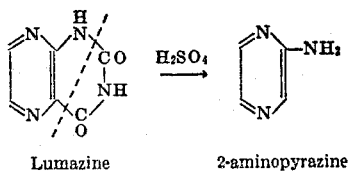

Lumazine      2-aminopyrazine

When proceeding according to our invention, the selected starting material is reacted with strongly concentrated mineral acid, as for instance, strongly concentrated sulfuric acid. For best results, the reaction is carried out at elevated temperatures, and the preferred temperature range is between 180–245° C.

After the cleavage of the pyrimidine ring has been effected, the reaction mixture may be worked up in various ways. For example, it may be strongly alkalinized, and the cleavage product, the amino-pyrazine, may be extracted from the alkalinized material with an organic solvent, such as ether, for example. After drying the ether extracts, the amino-pyrazine is obtained in high yields, and in substantially pure form. In some cases, as for example, in the case of 2-amino-5,6-diphenyl pyrazine, the product may be recovered from the strongly alkalinized solution of the reaction mixture, by simple filtration.

The following examples illustrate methods of carrying out the present invention, but it is to be understood that these examples are given by way of illustration and not of limitation.

Example I

To 50 cc. of preheated 100% sulfuric acid are added 5 gms. of hydrated (12% water) crude lumazine, and the mixture is held at 240–245° C. for 15 minutes. To the cooled reaction mixture is added 200 gms. of ice, followed by excess 30% sodium hydroxide. The strongly alkaline solution is extracted with ether, and the ether extracts are taken to dryness. Yield of 2-amino pyrazine, 2.01 gms. (79.1% theory) of melting point 118–120° C.

Example II

Eight gms. of crude 6,7-dimethyl lumazine are mixed with 120 cc. of 80% sulfuric acid, and the mixture is boiled under reflux at 195–200° C. for 75 minutes. The reaction mixture is worked up as described in Example I. A yield of 0.96 gm. of 2-amino-5,6-dimethyl pyrazine is obtained. If desired, this product may be further purified as follows:

0.96 gm. of 2-amino-5,6-dimethyl pyrazine are dissolved in hot benzene, a few drops of petroleum ether are added, and the solution is chilled at 0° C. 2-amino-5,6-dimethyl pyrazine crystallizes. The crystals are collected, and washed with petroleum ether. M. P. 140–144° C.

Example III

Fifteen gms. of crude 6,7-diphenyl lumazine (which can be obtained as described in J. Ind. Chem. Soc. 14, 627 (1937)) are mixed with 225 cc. of 80% sulfuric acid, and the mixture is boiled under reflux for 30 minutes at 195–200° C. To the cooled reaction mixture are added 1500 gms. of ice, followed by 700 cc. of 30% sodium hydroxide solution. The insoluble compound is filtered off, washed several times with 15% sodium hydroxide, and then with water, until free from alkali, and finally dried in vacuo. 2.40 gms. of 2-amino- 5,6-diphenyl pyrazine, of M. P. 224–226° C. are obtained. After one crystallization from ether, a white compound melting at 227–228° C. is obtained.

Example IV

Ten gms. of crude hydrated (8% water) 7-methyl lumazine are mixed with 200 cc. of 80% sulfuric acid, and the mixture is boiled under reflux for two hours at 195–200° C. To the cooled reaction mixture are added 1200 gms. of ice, followed by 800 cc. of 30% sodium hydroxide solution and 200 gms. of ammonium sulfate. The alkaline solution is extracted with ether, and the ether extracts are taken to dryness. 0.34 gm. of 2-amino-6-methyl pyrazine is obtained. After one crystallization from ether-petroleum ether, a yellow compound melting at 124–125° C. is obtained.

Example V

Two gms. of alloxazine are mixed with 10 cc. of 95% sulfuric acid and heated at 240–245° C. for 10 minutes. The reaction mixture is worked up in accordance with the procedure outlined in Example I. 0.76 gm. of 2-aminoquinoxaline, M. P. 155–156° C. is obtained in the form of pale yellow crystals.

Example VI

In like manner, phenanthralumazine (which can be obtained as described in Ber., 70, 761 (1937)) reacts with strongly concentrated sulfuric acid at a temperature of 180–245° C. to yield 2-aminophenanthrapyrazine.

Instead of the ether shown in the foregoing examples other organic solvents may be employed for the extraction of the amino pyrazine from the alkaline solution of the reaction mixture, such as, for instance, chloroform, benzene, etc.

This application is one of a series of applications upon related subject matter filed by applicants, Weijlard and Tishler, and in one instance with another applicant. These concurrently filed applications are as follows: Serial No. 502,965, relates to the decarboxylation, by heating with sulfuric acid, of 2-amino-3-carboxy-pyrazines and/or 2-hydroxy-3-carboxy-pyrazines; Serial No. 502,966, relates to cleavage of the pyrimidine ring of pyrimidopyrazines by heating the same with an aqueous solution of alkali-metal hydroxide; Serial No. 502,967, relates to the process of Serial No. 502,966 and in addition embraces the recovery of the free amino-carboxy-pyrazines and their decarboxylation; Serial No. 502,968, relates to cleavage of the pyrimidine ring of alloxazine by heating with ammonium hydroxide, followed by acidification and decarboxylation; Serial No. 502,969, relates to the thermal decarboxylation of 2-amino-3-carboxy-pyrazines and/or 2-hydroxy-3-carboxy-pyrazines; Serial No. 502,970, relates to the pyrimidine-ring cleavage of pyrimidopyrazines by treatment with aqueous alkali-metal hydroxide in excess to form alkali-metal salt of corresponding carboxy-pyrazines; and Serial No. 502,971 relates to cleavage of the pyrimidine ring of pyrimidopyrazines by heating same with concentrated sulfuric acid.

Modifications may be made in carrying out the present invention without departing from the spirit and scope thereof, and we are to be limited only by the appended claims.

We claim:

1. The process comprising reacting lumazine with strongly concentrated sulfuric acid, at a temperature of 180–245° C. and recovering 2-amino-pyrazine from the reaction mixture.

2. The process comprising reacting a monomethyl lumazine with strongly concentrated sulfuric acid, at a temperature of 180–245° C. and recovering monomethyl-2-amino pyrazine from the reaction mixture.

3. The process comprising reacting alloxazine with strongly concentrated sulfuric acid, at a temperature of 180–245° C. and recovering 2-amino-quinoxaline from the reaction mixture.

4. The process that comprises refluxing a compound containing a lumazine nucleus with concentrated sulfuric acid, and recovering a corresponding 2-amino pyrazine.

5. The process comprising reacting a compound containing a lumazine nucleus with strongly concentrated sulfuric acid, at a temperature of 180–245° C., and recovering a corresponding 2-amino pyrazine.

JOHN WEIJLARD.
MAX TISHLER.
ARTHUR E. ERICKSON.

REFERENCES CITED

The following references are of record in the file of this patent:

UNITED STATES PATENTS

| Number | Name | Date |
|---|---|---|
| 2,324,800 | Pasternack | July 20, 1943 |

OTHER REFERENCES

Jour. Amer. Chem. Soc., vol. 62 (1940), pages 664–5.

Jour. Amer. Chem. Soc., vol. 63 (1941), pages 1929–30.

Journ. Amer. Chem. Soc., vol. 63 (1941), pages 3153–54.

Chem. Abstracts, 1914, pp. 125–6.

Beilstein, vol. 25, page 126.

Berichte, vol. 40 (1907), pages 4850–4860.